Sept. 17, 1935.  F. S. MARCELLUS  2,014,943
HUMIDITY RESPONSIVE DEVICE
Filed March 31, 1932
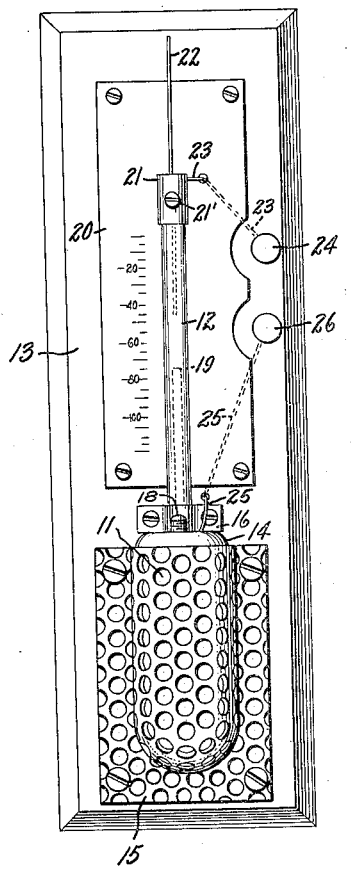
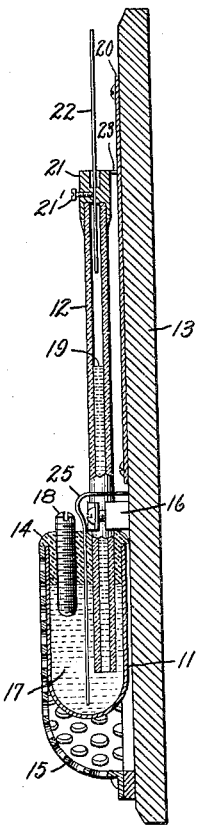
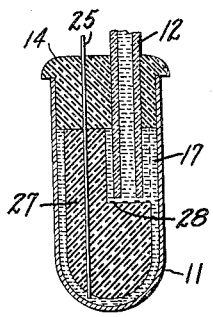
Inventor:
Fredrick S. Marcellus,
by Charles E. Tallon
His Attorney.

Patented Sept. 17, 1935

2,014,943

UNITED STATES PATENT OFFICE 2,014,943

HUMIDITY RESPONSIVE DEVICE

Fredrick S. Marcellus, Scotia, N. Y., assignor to General Electric Company, a corporation of New York Application March 31, 1932, Serial No. 602,182

7 Claims. (Cl. 297—1)

My invention relates to humidity responsive devices and has for its principal object the provision of simple, reliable direct indicating hygrometers and humidostats which may be produced at a small expense for material or labor. Other objects and advantages will become apparent as the description proceeds.

In accordance with my invention in its preferred form, a bulb or cup composed of wood, papier-mâché, or other fibrous or relatively rigid material is provided with an opening to which is attached a tube. The bulb is filled with a suitable liquid such as mercury which also partly fills the tube. In response to variations in humidity the walls of the bulb absorb or give off moisture thereby being caused to expand or contract and causing variations in the quantity of liquid which is contained in the tube. Suitable means such as a scale paralleling the tube may be provided for measuring the quantity of liquid therein to obtain an indication of humidity, or, if desired, the tube may be provided with electrical contacts in order to permit electrical circuits to be controlled by the position of the liquid within the tube in response to variations in humidity.

The features of my invention which I believe to be novel and patentable will be pointed out in the claims appended hereto. My invention itself, however, will be best understood by referring to the following description taken in connection with the accompanying drawing in which Fig. 1 is a front elevation of one embodiment of my invention; Fig. 2 is a side view in cross-section of the embodiment shown in Fig. 1; and Fig. 3 is a cross-sectional view of a portion of a modified apparatus of the type shown in Fig. 1.

Referring now more in detail to the drawing in which like reference characters refer to like parts throughout, I provide a bulb or cup 11 communicating with a tube 12 supported by a backing member 13. The cup 11 may be composed of wood, for example, pine, papier-mâché, or other materials having the property of expanding and contracting with variations in moisture content and preferably relatively rigid for the sake of greater durability. Fibrous material such as wood or papier-mâché has the advantage that the cups may be produced at very small cost, are sufficiently rigid to support themselves, and possess a high degree of durability. In the form of device shown, if the apparatus is to be utilized for indicating as well as for control purposes, the tube 12 is composed of glass or some other transparent substance.

If the cup 11 is composed of wood, preferably the side walls are made cylindrical and the upper portion is closed by means of a plug 14 having an opening in which the tube 12 may be inserted. However, it will be understood that I am not limited to this exact arrangement of forming a closed connection between the tube 12 and the cup 11.

If desired, a shield 15 formed, for example, by pressing from perforated sheet material may be utilized to protect the bulb 11 against crushing impacts or puncture. The tube 12 may be fastened to the backing 13 in any desired manner such as by means of one or more clamps 16. Since I use a relatively rigid material for the bulb 11, an independent support for the bulb 11 may, if desired, be dispensed with without danger of subjecting the material to strains or the apparatus to changes in calibration in case the device is suddenly moved from place to place.

A quantity of liquid, preferably one such as mercury which will not react on the substance of which the bulb 11 or the tube 12 are composed and to which said substance will be impervious, is placed within the bulb 11 so as to partly fill the tube 12. If desired, a screw 18 threaded through the plug 14 so as to extend slightly into the mass of liquid 17 may be provided in order to make minor adjustments in the quantity of liquid remaining in the tube 12 thereby adjusting the zero of the device. The level 19 of the liquid in tube 12 may be measured by means of a scale 20 calibrated to read directly in percentages of relative humidity. Preferably some form of cap 21 is used to close the upper end of the tube 12 against possible spillage of the liquid 17 without entirely cutting off the access of air pressure to the portion of the tube 12 above the level 19 of the liquid 17.

If a conducting liquid such as mercury is utilized to fill the cup 11 and tube 12, the device may be utilized to control electrical circuits in response to variations in humidity by providing one or more electrical contacts at suitable points in the tube 12. In the apparatus illustrated I have shown an adjustable electrode 22 in the form of a rod or wire passing through a hole in the cap 21, which for this purpose is composed of metal and provided with a set screw 21' for clamping the rod 22 and fixing the position of the lower end of the rod 22 within the tube. As here illustrated, the rod 22 is adjusted to the position in which the mercury 17 makes contact therewith when the humidity falls to 45%. The contact 22 and the cap 21 are connected by means of a conductor 23 to a binding post 24. A second conductor 25 which dips into the mercury in the cup 11 and is connected to the second binding post 26 is provided so that an electrical circuit from binding post 24 to 26 is closed when the level 19 of the mercury 17 rises to the lower end of the rod 22. Any desired apparatus such as remote indicating or humidity correcting apparatus may be controlled by means of suitable electrical apparatus (not shown) having leads connected to the binding posts 24 and 26.

If a relatively costly liquid such as mercury is employed, I may, if desired, further reduce the cost of my device by filling the greater portion of the inner cavity of the bulb 11 with a body 27, as shown in Fig. 3, conforming substantially to the shape of the cavity in the bulb 11 but slightly smaller so as to leave only a small space for the liquid 17, thereby greatly reducing the quantity of liquid required. In order to permit free passage of liquid 17 between the bulb 11 and tube 12, and, if desired, to permit the tube 12 to extend into the inner portion of bulb 11, a portion 28 of the body 27 is cut away. Since the body 27 is surrounded by mercury and is furthermore wholly enclosed, it will not be subjected to variations in moisture and consequently it may be composed of wood, glass, porcelain, or any other desired material without regard to its hygrometric properties.

In accordance with the provisions of the patent statutes I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. A humidity responsive device comprising a wooden bulb expansible and contractible with variations in humidity, a closure therefor having an opening therein, a tube joined to said opening, and a quantity of mercury contained in said bulb and said tube, the relative quantity of mercury in said tube varying with variations in humidity.

2. A humidity responsive device comprising a hollow wooden body expansible and contractible with variations in humidity and having an opening therein, a tube connected to said body at said opening, and a quantity of liquid contained in said hollow body and said tube, the relative quantity of liquid in said tube varying with variations in humidity.

3. A humidity responsive device comprising a rigid bulb composed of fibrous material expansible and contractible with variations in humidity and having an opening therein, a tube connected to said bulb at said opening, a quantity of liquid filling said bulb and a portion of said tube, said portion varying with variations in humidity.

4. A humidity responsive device comprising a rigid bulb composed of a material expansible and contractible with variations in moisture content, a relatively non-expansible tube connected to said bulb, and a quantity of liquid contained in said bulb and said tube, a portion of said liquid being transferred to and from said tube in response to variations in humidity.

5. A humidity responsive device comprising a cup which comprises a fibrous material expansible and contractible with variations in moisture content, a body contained within said cup and conforming substantially to the shape of the space within said cup but smaller than said space, a relatively non-expansible tube connected to the interior of said cup, a liquid occupying the free space in said cup and a portion of said tube, the portion of said tube occupied by said liquid varying with humidity.

6. In a humidity responsive device, a hollow wooden body expansible and contractible with variations in humidity and having an opening therein adapted to receive a tube, and a quantity of liquid contained in said hollow body.

7. In a humidity responsive device, the combination of a rgid bulb composed of fibrous material expansible and contractible with variations in humidity and having an opening therein, and a quantity of liquid filling said bulb and being partially ejected from and retracted into said bulb in response to variations in humidity.

FREDRICK S. MARCELLUS.